United States Patent [19]
Süto et al.

[11] 4,406,787
[45] Sep. 27, 1983

[54] CARTRIDGE-TYPE FILTERING ASSEMBLY FOR MOTOR OIL AND THE LIKE

[75] Inventors: Ferenc Sütó, Szigetszentmiklos; Jozsef Fodor, Budapest; Frigyes Siegfried, Budapest; Jozsef Gyarfas, Budapest, all of Hungary

[73] Assignee: "ARMAFILT" Egyesült Müszaki Tömitő és Gépszakmai Ipari Szövetkezet, Budapest, Hungary

[21] Appl. No.: 340,012

[22] Filed: Jan. 18, 1982

Related U.S. Application Data

[63] Continuation of Ser. No. 167,017, Jul. 9, 1980, abandoned.

[30] Foreign Application Priority Data

Jul. 12, 1979 [HU] Hungary ................ AA 935

[51] Int. Cl.³ ................ B01D 27/00

[52] U.S. Cl. ................ 210/315; 210/342; 210/487; 210/492; 210/493.1

[58] Field of Search ................ 210/130, 168, 315, 342, 210/428, 433.1, 434, 487, 488, 489, 492, 493.1, 493.2, 493.5

[56] References Cited

U.S. PATENT DOCUMENTS

| | | | |
|---|---|---|---|
| 1,969,033 | 8/1934 | Redner | 210/434 |
| 1,987,847 | 1/1935 | Flood | 210/434 |
| 2,675,127 | 4/1954 | Layte | 210/493.2 |
| 2,723,035 | 11/1955 | Anderson | 210/434 |
| 3,233,737 | 2/1966 | Hultgren | 210/434 |
| 3,269,541 | 8/1966 | Neely | 210/315 |
| 3,339,739 | 9/1967 | Dye | 210/434 |
| 3,362,541 | 1/1968 | Briggs | 210/493.1 |
| 3,368,687 | 2/1968 | Ruschman | 210/493.1 |
| 3,372,533 | 3/1968 | Rummel | 210/493.1 |
| 3,384,241 | 5/1968 | Nostrand | 210/315 |
| 3,390,780 | 7/1968 | Bennett | 210/342 |
| 3,396,103 | 8/1968 | Huntington | 210/342 |
| 3,397,793 | 8/1968 | MacDonnell | 210/457 |
| 3,455,457 | 7/1969 | Popelar | 210/434 |
| 3,520,417 | 7/1970 | Dürr | 210/493.1 |
| 4,089,783 | 5/1978 | Holyoak | 210/493.1 |
| 4,203,739 | 5/1980 | Erdmannsdorfer | 210/315 |

FOREIGN PATENT DOCUMENTS

| | | | |
|---|---|---|---|
| 1611051 | 10/1970 | Fed. Rep. of Germany . | |
| 2256463 | 6/1974 | Fed. Rep. of Germany . | |
| 2434075 | 2/1976 | Fed. Rep. of Germany . | |
| 2542426 | 4/1976 | Fed. Rep. of Germany | 210/433.1 |
| 2840117 | 4/1979 | Fed. Rep. of Germany . | |
| 707865 | 4/1954 | United Kingdom | 210/434 |
| 2637688 | 7/1978 | U.S.S.R. . | |
| 633556 | 11/1978 | U.S.S.R. | 210/342 |
| 647002 | 2/1979 | U.S.S.R. . | |

*Primary Examiner*—Ernest G. Therkorn
*Attorney, Agent, or Firm*—Karl F. Ross; Herbert Dubno

[57] ABSTRACT

A cartridge-type oil-filtering assembly comprises two coaxially nested tubular filter elements of star-shaped cross-section consisting of undulating sheet material of fine and super-fine porosity, respectively, each filter element defining an annular array of generally triangular compartments. Respective compartments of the fine and the super-fine filter element communicate with each other through the pores of the super-fine filter element as well as through individual bypasses of relatively reduced cross-section; these bypasses may be formed by channels extending within annular face plates of the cartridge or by apertures in the undulation peaks of the super-fine filter element.

4 Claims, 6 Drawing Figures

COARSE STRAINER
FINE FILTER
SUPER-FINE FILTER
1 2 3 4 5 6 7 8 9 10 11 12 22 21,21'

CARTRIDGE-TYPE FILTERING ASSEMBLY FOR MOTOR OIL AND THE LIKE

This is a continuation of application Ser. No. 167,017, filed July 9, 1980, now abandoned.

FIELD OF THE INVENTION

Our present invention relates to a filter arrangement for filtering liquids, especially motor oil. Advantageously, the filter arrangement comprises one or more strainers and one or more fine filters, the latter being directly or indirectly connected to the lubrication system.

BACKGROUND OF THE INVENTION

It is known that lubricating oils suffer, during their use, changes from the lubricating process and as a result thereof the lubricating properties deteriorate. Some of the structural elements (for example, Perlite) passing into the oil during the movement of metal parts cause abrasive wear. Quartz, as the most frequently encountered part of solid air contaminants, also causes abrasive wear. The contaminants coming from construction material or passing from the outside into the system not only decrease the lifetime of the lubricated parts by abrasive wear but also act to catalyze the oxidation of the oil, since these impurities are excellent oxidation catalysts. In order to increase the lifetime of the lubricated parts and to avoid deterioration of the oil, it is necessary to filter the lubricating oils as completely as possible. If the presently employed fine oil filters operate free from defects, then the contamination of the oil amounts to several thousands of a gram per 100 ml. With such a degree of contamination, lubricating oils of the quality CD have to be changed every one thousand operating hours.

The time between two oil changes can be increased to 5000 to 10,000 hours of operation, as is to be expected, by reducing the degree of contamination of the oil by more effective filtration. For this purpose the degree of oil contamination has to be decreased to a few $10^{-4}$ g/100 ml. In the present description oil filtration of this quality is designated as super-fine oil filtration (SF-filtering). By changing the conventional fine filtering to super-fine filtering not only can the properties of the lubricating oil be more fully used and its lifetime increased, but also the wear can be decreased by reduction of the amount and size of the abrasive particles circulated with the motor oil and thereby the life time of the motor is favorably influenced.

SUMMARY OF THE INVENTION

The invention is based on the recognition that the high resistance caused by incorporation of super-fine filters into the filter system can be substantially decreased by the addition of a corresponding number of suitably dimensioned free-flow-through openings connected in parallel to the super-fine filter. In this way only part of the lubricating liquid passes through the super-fine filter while the remainder of the lubricating liquid passes by.

It is known that filter arrangements are in general constructed in such way that the total amount of oil flows through the filters in parallel or through one of them. Pressure-relief valves are provided in by-pass lines and these lines have only the purpose of allowing an undisturbed oil supply in case of a stoppage of the filter with an opened back-pressure valve.

A cartridge-type filtering assembly according to our invention comprises an inner and an outer perforated cylindrical shell which are centered on a common axis and are separated from each other by an annular space closed at opposite ends by a pair of annular face plates transverse to that axis. A first tubular filter element of star-shaped cross-section in that annular space, centered on the axis of the shells, consists of undulating sheet material of relatively large porosity which is referred to hereinafter as a fine filter, its undulations defining an annular array of generally triangular first compartments; the peaks of these undulations point to one of the shells, specifically the outer one in the embodiments described hereinafter. A second tubular filter element in the annular space, also of star-shaped cross-section and concentric with the first filter element, consists of undulating sheet material of relatively small porosity which is referred to hereinafter as a super-fine filter and defines an annular array of generally triangular second compartments open toward the other shell, i.e. the inner one in the described embodiments; the peaks of the undulations of this filter element also point toward the first-mentioned (outer) shell. The first compartments are directly connected to respective second compartments through restricted passages which bypass the pores of the second filter element whereby particles in the fine-filtered liquid unable to traverse the super-fine filter can reach the outlet of the cartridge without further filtering.

The restricted passages according to our invention may be formed by channels extending within at least one of the face plates of the cartridge or, alternatively, by apertures in the peaks of the undulations of the second filter element.

BRIEF DESCRIPTION OF THE DRAWING

The above and other features of our invention will become more readily apparent from the following description, reference being made to the accompanying drawing in which.

SPECIFIC DESCRIPTION

Figure 1:
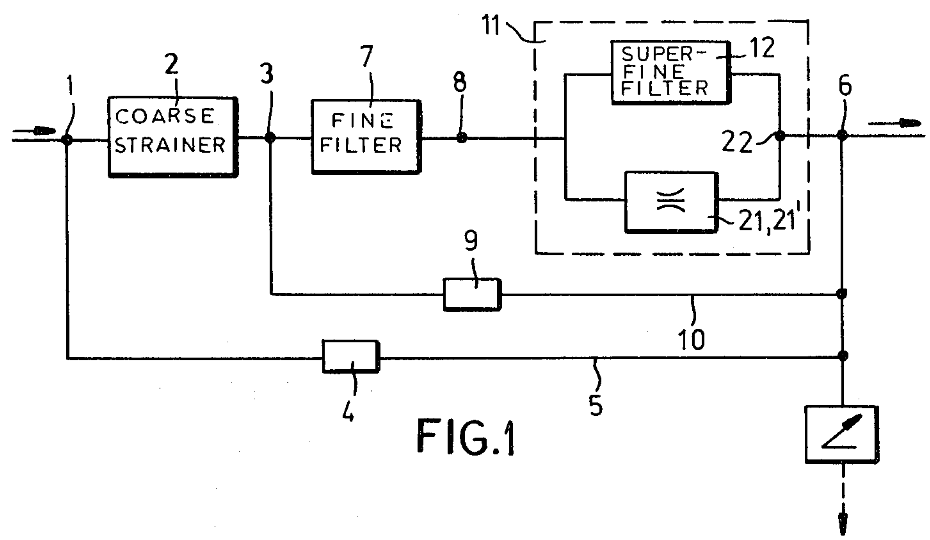
FIG. 1 is a block diagram of a filter system for motor oils provided with a super-fine unit according to the present invention.

At the input of the filter system shown in the drawing the unfiltered liquid passes from the liquid inlet 1 through the coarse strainer 2 into the prefiltration zone 3. If the strainer 2 is plugged up, the liquid passes directly into the lubrication outlet 6 through a by-pass line 5 containing a back-pressure valve 4. From the prefiltration zone 3 the oil passes through a fine filter 7 into the fine-filtration zone 8. If the fine filter 7 is plugged up, the liquid passes through a by-pass line 10, containing back-pressure valve 9, directly into the lubrication outlet 6.

In the conventional filter arrangements the fine-filtration zone 8 coincides with the lubrication outlet 6. In the arrangement according to the invention a super-fine filter unit 11 is provided between the fine-filtration zone 8 and the lubrication outlet 6. The unit 11 comprises a super-fine filter 12 and one or more unobstructed through-flow openings 21, 21' connected in parallel with one super-fine filter 12.

If required, several in the filter disposition also several parallel filtering branches can be provided. The parallel branches can be formed in each case from a single kind of filter; thus several coarse strainers 2, several fine filters 7 or several super-fine filter units 11 may be connected in parallel with one another. We could also, however, dispose two or all three kinds of filter in parallel branches.

We shall now describe particular embodiments of a fine filter 7 and a super-fine unit 11. In one instance the fine filter 7 and the super-fine filter unit 11 can be combined into one building block. Advantageously, the fine filter 7 and the super-fine filter 12 are designed as cylindrical tubes with vertically disposed axes whose cross-section is a closed curve. (The cylinder need not have a circular cross-section but may be of any form having generatrices parallel to the axis.) These cylindrical tubes can be nested. In case the filtration is from the inside to the outside, the fine filter 7 is the inner cylinder. With the opposite filtering direction the super-fine filter 12 is inside.

In a further advantageous embodiment the fine filter 7 and the super-fine filter 12 are disposed coaxially around a common axis.

Figure 2:
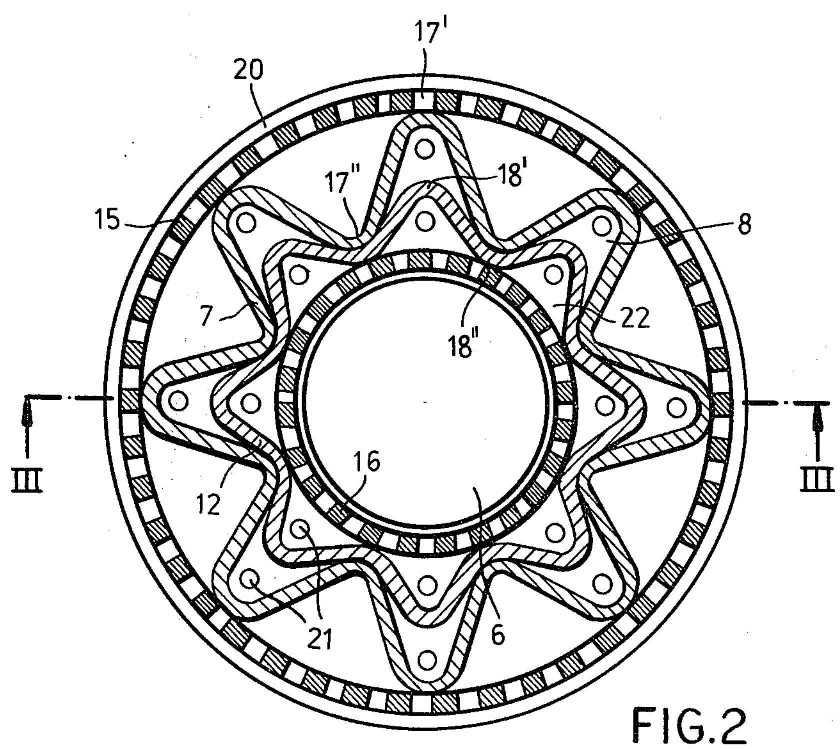
FIG. 2 is a cross-sectional view through a filter arrangement according to one embodiment of the present invention.

An embodiment of the invention is shown in a section transverse to the filter axis 14 in FIG. 2. Between a circularly cylindrical outer reinforcing sleeve 15 and a circularly cylindrical inner reinforcing sleeve 16 the fine filter 7 and the super-fine filter 12 are disposed as sheets having a star-shaped cross-section formed by undulations 17 or 18, respectively. In this example the flow direction is radially inward, therefore the fine filter 7 is disposed outside. The stars have the same number of undulations. The fine filter 7 and the super-fine filter 12 are disposed coaxially, and the undulations 18 of the star-shaped inner super-fine filter 12 protrude into the undulations 17 of the star-shaped fine filter 7. The generatrices of the undulations 17 and 18 be parallel to the filter axis. Advantageously, in each case the fine filter and the super-fine filter are juxtaposed at the respective troughs 17'' and 18'' of their undulations 17 and 18. The respective peaks 17' and 18' of the undulations 17 an 18, are, however, somewhat distant from each other, thereby defining between them the fine-filtering zone or compartment 8.

The cylindrical space formed between the inner and outer shells 16 and 15 is bounded on one end by an annular face plate 19 and on the other end by an annular face plate 20. U-shaped channels 21 are disposed in these plates 19 and 20 in the embodiment shown in FIGS. 2 and 3. These channels 21 correspond in the schematic representation according to FIG. 1 to the correspondingly designated through-flow openings. As can be seen from FIG. 3, the channels 21 are so located that the radial planes passing through their center lines coincide with the planes passing through the peaks 17' and 18' of the undulations 17 and 18 of the star-shaped closed curves 17 and 18 as well as through the joint filter axis 14.

In this way, the channels 21 connect the annularly arrayed, generally triangular compartments 8 for the fine-filtered liquid with the annularly arrayed, generally triangular compartments 22 for the super-fine filtered liquid located inwardly of the super-fine filter 12, from which the liquid passes directly into the lubrication outlet 6.

Figure 3:
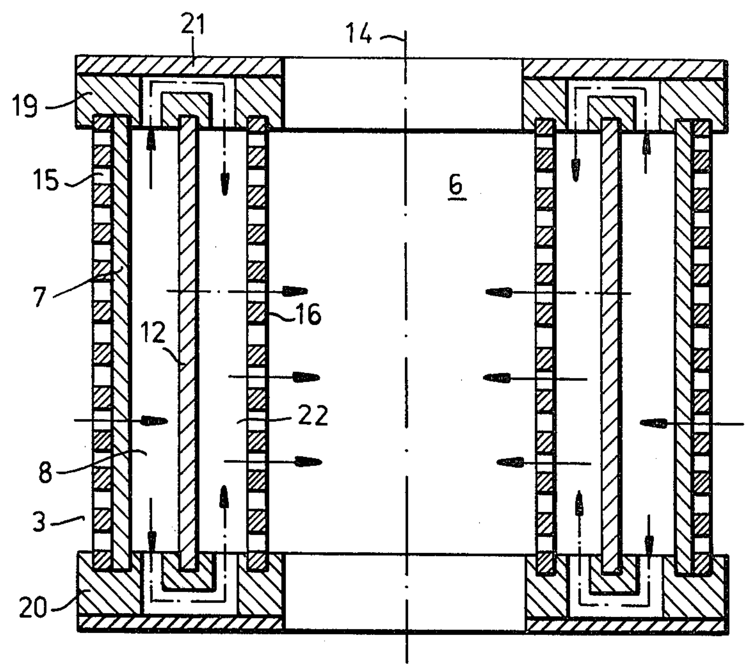
FIG. 3 is a sectional view taken along line III—III through the filter according to FIG. 2.
Figure 5:
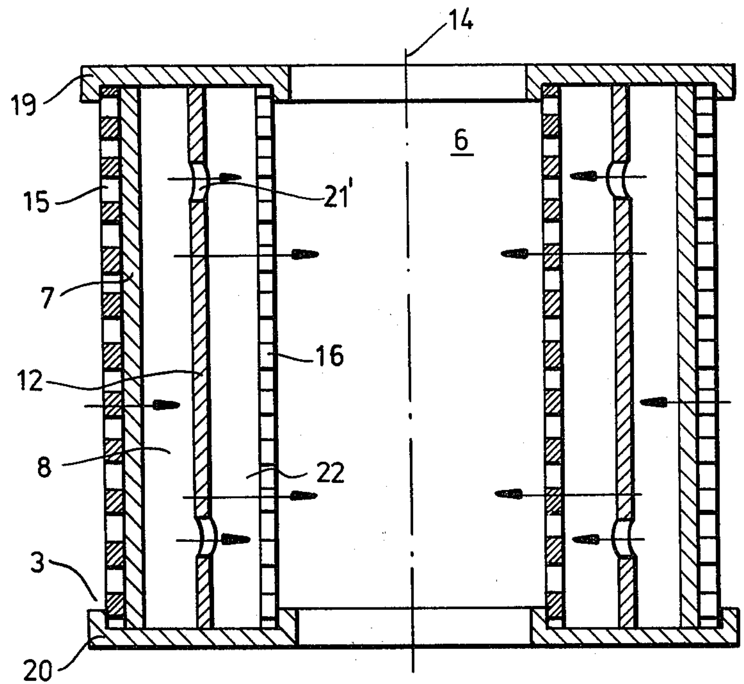
FIG. 5 is a longitudinal sectional view taken along line V—V through the filter arrangement according to FIG. 4.
Figure 4:
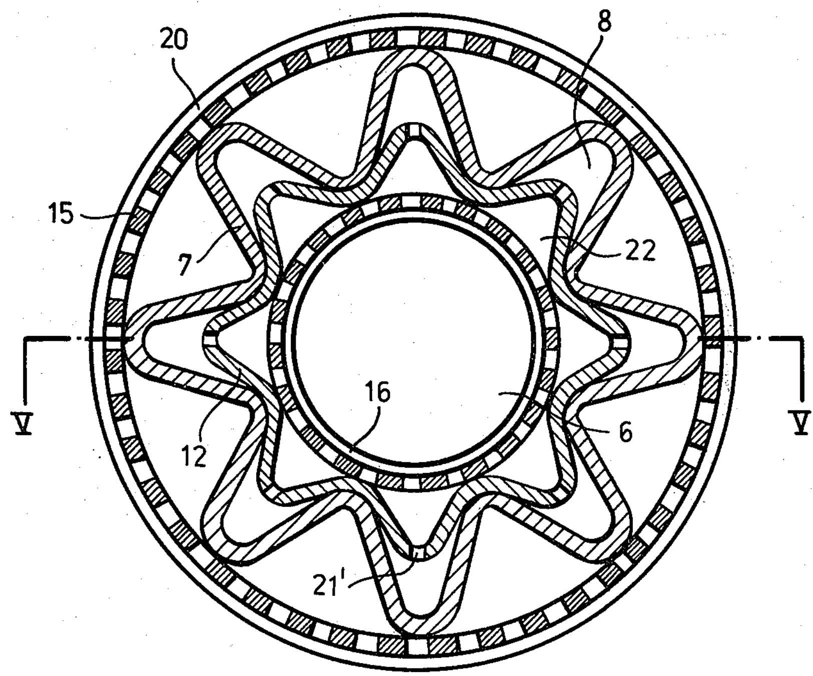
FIG. 4 is a cross-sectional view through another embodiment of the filter arrangement according to the present invention.

The embodiment shown in FIGS. 4 and 5 deviates from the one shown in FIGS. 2 and 3, in that the bypass openings 21' are disposed in the super-fine filter 12 itself and the fore plates 19' and 20' can therefore be constructed from thinner material.

The fine filter 7 and the super-fine filter 12, consisting of sheet material (specifically paper) of different porosity, are advantageously designed as an exchangeable inserts.

Figure 6:
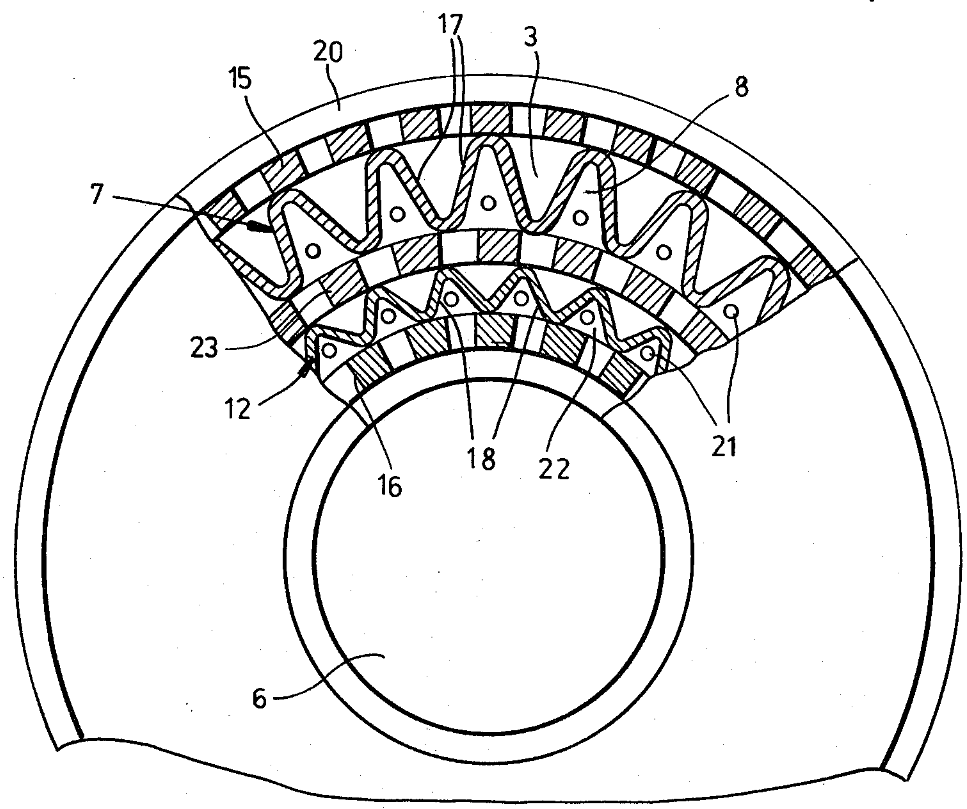
FIG. 6 is a partial cross-sectional view of another embodiment of the invention.

If further stiffening is necessary, an intermediate reinforcing sleeve or shell 23 can be disposed between the fine filter 7 and the super-fine filter 12 as is shown in FIG. 6.

If the super-fine filter 12 is incorporated into a cartridge-type filtering assembly for motor oil, then the very small contamination particles will be continuously removed by it in the course of continuous circulation of the total motor oil. The catalyzing effect of the contaminants favoring chemical degradation of the motor oil is decreased thereby and the maximum interval between two oil changes is increased. By removal of the abrasive materials from the oil, the so-called inner abrasive wear is decreased, whereby the lifetime of the motor or of the lubricated parts is lengthened.

A cartridge-type filter as disclosed above, capable of achieving these advantages, can be manufactured with conventional apparatus suitable for the production of oil filters.

The super-fine filtration can be employed in most lubrication systems. These filters can be substituted for the usual filters formed as paper inserts. Upon formation of corresponding connections, centrifugal filters with by-pass circuits can be replaced by super-fine filters.

We claim:

1. A cartridge-type filtering assembly for motor oil and the like, comprising:

an inner and an outer perforated cylindrical shell centered on a common axis and separated by an annular space;

a pair of annular face plates transverse to said axis closing said annular space at opposite ends thereof;

a first tubular filter element of star-shaped cross-section in said annular space centered on said axis, said first filter element consisting of undulating sheet material of relatively large porosity whose undulations define an annular array of generally triangular first compartments and have first peaks pointing to one of said shells; and a second tubular filter element of star-shaped cross-section in said annular space concentric with said first filter element, said second filter element consisting of undulating sheet material of relatively small porosity whose undulations define an annular array of generally triangular second compartments open toward the other of said shells and have second peaks pointing toward said one of said shells, said first compartments being directly connected to respective second compartments through restricted passages bypassing the pores of said second filter element.

2. A filtering assembly as defined in claim 1 wherein said passages are channels extending within at least one of said face plates.

3. A filtering assembly as defined in claim 1 wherein said passages are apertures in said second peaks.

4. A filtering assembly as defined in claim 3 wherein said second peaks project into said first compartments.

* * * * *